(12) United States Patent
Yuan

(10) Patent No.: US 12,146,692 B2
(45) Date of Patent: Nov. 19, 2024

(54) CONTROL METHOD AND CONTROL SYSTEM

(71) Applicant: HANGZHOU SANHUA RESEARCH INSTITUTE CO., LTD., Zhejiang (CN)

(72) Inventor: Xin Yuan, Zhejiang (CN)

(73) Assignee: HANGZHOU SANHUA RESEARCH INSTITUTE CO., LTD., Zhejiang (CN)

( * ) Notice: Subject to any disclaimer, the term of this patent is extended or adjusted under 35 U.S.C. 154(b) by 239 days.

(21) Appl. No.: 17/782,808

(22) PCT Filed: Dec. 7, 2020

(86) PCT No.: PCT/CN2020/134227
§ 371 (c)(1),
(2) Date: Jun. 6, 2022

(87) PCT Pub. No.: WO2021/115222
PCT Pub. Date: Jun. 17, 2021

(65) Prior Publication Data
US 2023/0011731 A1 Jan. 12, 2023

(30) Foreign Application Priority Data
Dec. 9, 2019 (CN) .......................... 201911247970.0

(51) Int. Cl.
*F25B 41/31* (2021.01)
*F25B 49/02* (2006.01)
*G05B 15/02* (2006.01)

(52) U.S. Cl.
CPC .............. *F25B 41/31* (2021.01); *F25B 49/02* (2013.01); *G05B 15/02* (2013.01); *F25B 2600/2513* (2013.01)

(58) Field of Classification Search
CPC .. F25B 41/31; F25B 49/02; F25B 2600/2513; G05B 15/02
See application file for complete search history.

(56) References Cited

U.S. PATENT DOCUMENTS

| | | | | |
|---|---|---|---|---|
| 4,325,508 A | * | 4/1982 | Kunz | F25B 41/335 251/294 |
| 4,527,399 A | * | 7/1985 | Lord | F25B 41/35 62/212 |

(Continued)

FOREIGN PATENT DOCUMENTS

| | | |
|---|---|---|
| CN | 1456854 A | 11/2003 |
| CN | 101603751 A | 12/2009 |

(Continued)

OTHER PUBLICATIONS

International Search Report dated Feb. 23, 2021 for PCT Appl. No. PCT/CN2020/134227.

(Continued)

*Primary Examiner* — Henry T Crenshaw
(74) *Attorney, Agent, or Firm* — Ohlandt, Greeley and Perle, L.L.P.

(57) ABSTRACT

A control system and a control method, which can control an electronic expansion valve. The method comprises: acquiring a temperature signal of an electronic expansion valve outlet and a pressure signal of the electronic expansion valve outlet; determining a first current degree of superheat on the basis of the temperature signal of the electronic expansion valve outlet and the pressure signal of the electronic expansion valve outlet; and a processing unit controlling, according to the requirements of an upper computer or the requirements of a set condition, an electronic expansion value to operate one of a temperature control mode, a degree of superheat control mode and an opening control mode.

19 Claims, 4 Drawing Sheets

(56) References Cited

U.S. PATENT DOCUMENTS

| | | | |
|---|---|---|---|
| 2005/0126193 A1* | 6/2005 | Lifson | F25B 49/02 62/175 |
| 2007/0068178 A1* | 3/2007 | Honma | F25B 49/02 62/160 |
| 2007/0107255 A1* | 5/2007 | Tamura | F26B 21/086 34/465 |
| 2009/0031740 A1* | 2/2009 | Douglas | F25B 13/00 236/92 B |
| 2011/0174059 A1* | 7/2011 | Yonemori | F25B 49/005 73/40 |
| 2013/0160474 A1 | 6/2013 | Qu et al. | |
| 2013/0239602 A1 | 9/2013 | Yamashita et al. | |
| 2018/0017271 A1 | 1/2018 | Luo et al. | |
| 2019/0078818 A1 | 3/2019 | Khaled et al. | |

FOREIGN PATENT DOCUMENTS

| | | |
|---|---|---|
| CN | 104748261 A | 7/2015 |
| CN | 106196764 A | 12/2016 |
| CN | 106595157 A | 4/2017 |
| EP | 0693663 A2 | 1/1996 |
| EP | 0732551 * | 9/1996 |
| EP | 0732551 A2 | 9/1996 |
| EP | 3483531 A2 | 5/2019 |
| JP | S6129666 A | 2/1986 |
| JP | S61175457 A | 8/1986 |
| JP | H02272261 A1 | 11/1990 |
| JP | 2001201213 A | 7/2001 |
| JP | 2003130426 A | 5/2003 |
| WO | 2012104892 A1 | 8/2012 |

OTHER PUBLICATIONS

Japanese Office Action dated Dec. 26, 2023 for Japanese Appl. No. 2022-534303.
Extended European Search Report dated Jan. 8, 2024 for European Appl. No. 20898562.2.
Japanese Office Action dated Jun. 6, 2023 for Japanese Appl. No. 2022-534303.

* cited by examiner

CONTROL METHOD AND CONTROL SYSTEM

This application is the national phase of International Patent Application No. PCT/CN2020/134227, titled "CONTROL METHOD AND CONTROL SYSTEM", filed on Dec. 7, 2020, which claims the priority to Chinese Patent Application No. 201911247970.0 titled "CONTROL METHOD AND CONTROL SYSTEM", filed on Dec. 9, 2019 with the Chinese Patent Office, both of which are incorporated herein by reference in their entireties.

BACKGROUND

1. Field of the Disclosure

The present disclosure relates to the technical field of automatic control, and in particular to a control system and a control method.

2. Discussion of the Background Art

As electronic expansion valve, as a throttling element, is used in an air conditioning cooling system and a battery water cooling system. A flow of a refrigerant is controlled by controlling an opening of the electronic expansion valve to achieving a cooling effect.

After obtaining a target opening from an upper computer, the electronic expansion valve operates at the target opening, so that the operation of the electronic expansion valve is controlled. However, the upper computer has multiple modes, and the electronic expansion valve operates in a single mode. Therefore, it is required to further improve the real-time performance and accuracy of the control of the electronic expansion valve.

SUMMARY

In view of this, a control system and a control method are provided according to the embodiments of the present disclosure to improve the real-time performance and the accuracy of the control system for the electronic expansion valve.

In a first aspect, a control method, for controlling an electronic expansion valve, is provided according to an embodiment of the present disclosure. The control method includes: obtaining a temperature signal at an outlet of the electronic expansion valve and a pressure signal at the outlet of the electronic expansion valve; using the temperature signal at the outlet of the electronic expansion valve and the pressure signal at the outlet of the electronic expansion valve as all or a part of an input signal, and determining a first current superheat; and controlling, by a processing unit according to a requirement from an upper computer or a predetermined condition, the electronic expansion valve to operate in one of a temperature control mode, a superheat control mode and an opening control mode.

In a second aspect, a control system is provided according to an embodiment of the present disclosure. The control system is capable of controlling an electronic expansion valve. The control system includes a controller. The controller includes a processing unit, a first temperature detection unit and a pressure detection unit. The first temperature detection unit is configured to obtain a temperature signal at an outlet of the electronic expansion valve. The pressure detection unit is configured to obtain a pressure signal at the outlet of the electronic expansion valve. A first input terminal of the processing unit is electrically connected to an output terminal of the first temperature detection unit, a second input terminal of the processing unit is electrically connected to an output terminal of the pressure detection unit, the temperature signal at the outlet of the electronic expansion valve and the pressure signal at the outlet of the electronic expansion valve are used as all or a part of an input signal, and a first current superheat is determined. The controller is integrated with a temperature control mode, a superheat control mode and an opening control mode. The processing unit is configured to control the electronic expansion valve to operate in one of the temperature control mode, the superheat control mode and the opening control mode according to a requirement from an upper computer or a predetermined condition. The controller is a part of the electronic expansion valve.

In the technical solutions according to the embodiments of the present disclosure, the processing unit controls the electronic expansion valve to operate in one of the temperature control mode, the superheat control mode and the opening control mode according to the requirement from the upper computer or the predetermined condition. In a case that the upper computer has multiple modes, the electronic expansion valve may operates in one of the multiple modes according to requirements, thereby improving the real-time performance and accuracy of the control of the electronic expansion valve.

DETAILED DESCRIPTION OF THE PREFERRED EMBODIMENT

Figure 1:
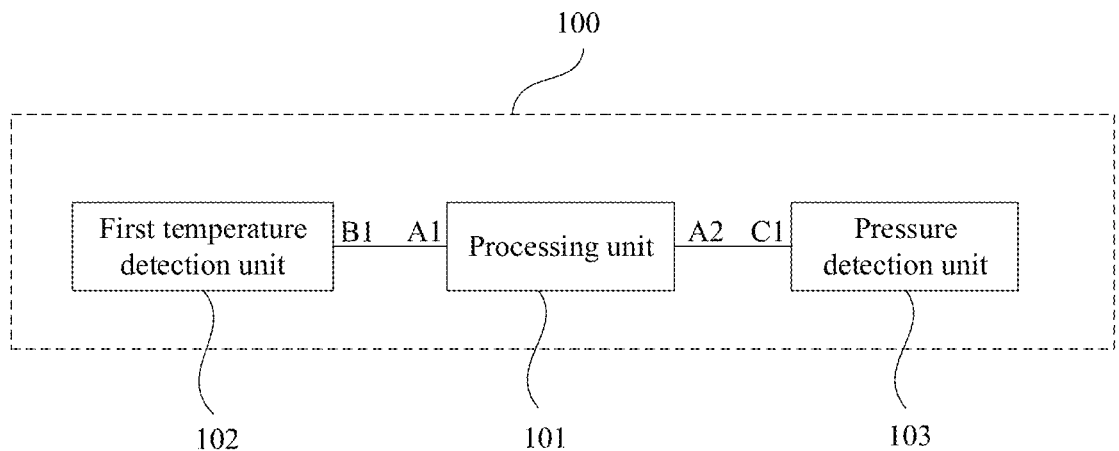
FIG. 1 is a schematic structural diagram of a control system according to an embodiment of the present disclosure.

Hereinafter, the present disclosure is further described in detail in conjunction with drawings and embodiments. It should be understood that the embodiments described herein are only used to explain the present disclosure, rather than limiting the present disclosure. In addition, it should be noted that, for ease of description, only some of structures related to the present disclosure, rather than all of the structures, are show in the drawings.

A control system, for controlling an opening of an electronic expansion valve, is provided according to an embodiment of the present disclosure. FIG. 1 shows a schematic structural diagram of a control system according to an embodiment of the present disclosure. As shown in FIG. 1, the control system includes a controller 100. The controller 100 includes a processing unit 101, a temperature detection unit 102 and a pressure detection unit 103. The temperature detection unit 102 is configured to obtain a temperature signal at an outlet of the electronic expansion valve. The pressure detection unit 103 is configured to obtain a pressure signal at the outlet of the electronic expansion valve. A first input terminal A1 of the processing unit 101 is electrically connected to an output terminal B1 of the temperature detection unit 102. A second input terminal A2 of the processing unit 101 is electrically connected to an output terminal C1 of the pressure detection unit 103. A first current superheat is determined based on the temperature signal at the outlet of the electronic expansion valve and the pressure signal at the outlet of the electronic expansion valve. The controller is integrated with a temperature control mode, a superheat control mode and an opening control mode. The processing unit 101 controls the electronic expansion valve to operate in one of the temperature control mode, the superheat control mode and the opening control mode according to a requirement from the upper computer or a predetermined condition. The controller 100 is a part of the electronic expansion valve.

In the embodiment, for example, the processing unit 101 includes a motor control module. The motor control module drives a motor of the electronic expansion valve to operate. The motor includes a rotor assembly and a stator assembly. The temperature detection unit 102 may be a temperature sensor or a temperature detection circuit. The temperature sensor may be a thermocouple or a thermal resistor. For example, the pressure detection unit 103 may be a pressure sensor or a pressure detection circuit.

The superheat is a difference between a superheat temperature and a saturation temperature of a refrigerant under a same evaporation pressure in a refrigeration cycle. The saturation temperature may be queried according to the evaporation pressure. The refrigerant absorbs heat from the environment in the evaporation process, so that the temperature of the environment is reduced. A better cooling effect of the refrigerant is achieved in a case of a greater superheat. A greater opening of the electronic expansion valve indicates a greater flow of the refrigerant, thereby achieving a better cooling effect.

In a case that the first current superheat is less than a first warning threshold, the cooling effect of the refrigerant is poor. It is required to control the opening of the electronic expansion valve to control the first current superheat to be equal to a preset superheat. A temperature at the outlet of the electronic expansion valve is equal to a preset temperature at the outlet of the electronic expansion valve, and a pressure at the outlet of the electronic expansion valve is equal to a preset pressure at the outlet of the electronic expansion valve, so that the first current superheat may be accurately calculated.

According to the conventional technology, a temperature detection unit and a pressure detection unit are arranged on the body of the electronic expansion valve, and an output terminal of the electronic expansion valve is electrically connected to an upper computer. Therefore, the opening of the electronic expansion valve is controlled only by the upper computer, resulting in a large workload of the upper computer and poor real-time performance and poor accuracy of the control system for the opening of the electronic expansion valve.

According to the technical solutions in the embodiments of the present disclosure, a temperature detection unit 102 and a pressure detection unit 103 are integrated in a controller 100 of the electronic expansion valve. The processing unit 101 may determine the first current superheat based on the temperature signal at the outlet of the electronic expansion valve and the pressure signal at the outlet of the electronic expansion valve. The controller of the electronic expansion valve obtains the temperature and the pressure at the outlet of the electronic expansion valve, and calculates the first current superheat. The processing unit 101 may operate in the opening control mode to control the opening. Therefore, the intelligence of the electronic expansion valve is improved, the workload of the upper computer is reduced, and the real-time performance and the accuracy of the control system for the opening of the electronic expansion valve are improved.

Figure 2:
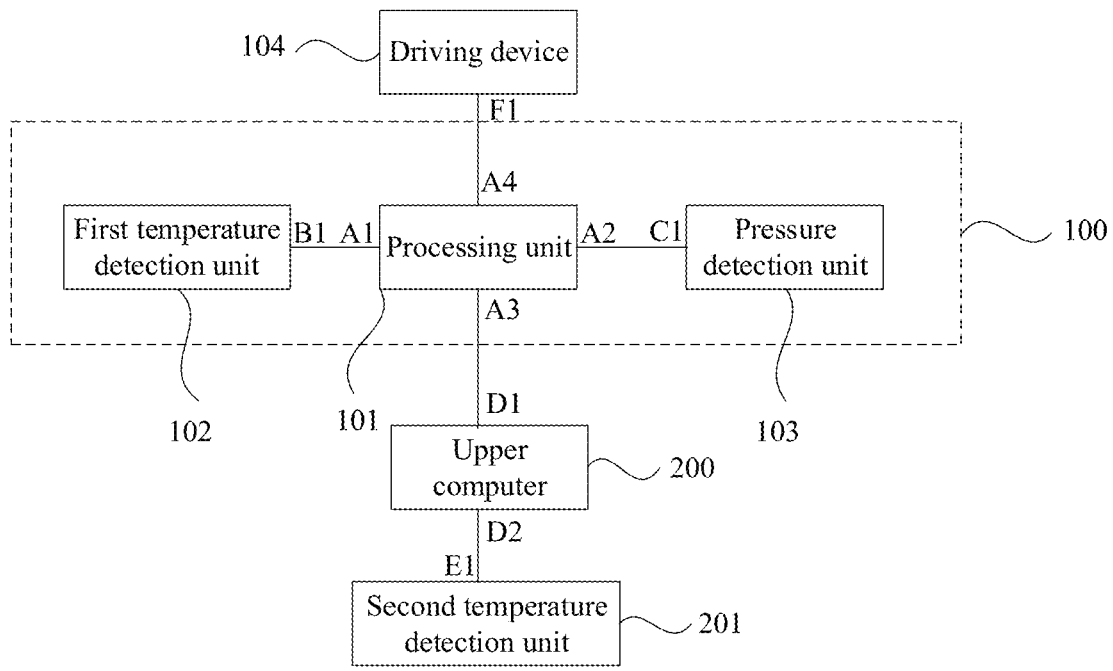
FIG. 2 is a schematic structural diagram of a control system according to another embodiment of the present disclosure.
Figure 4:
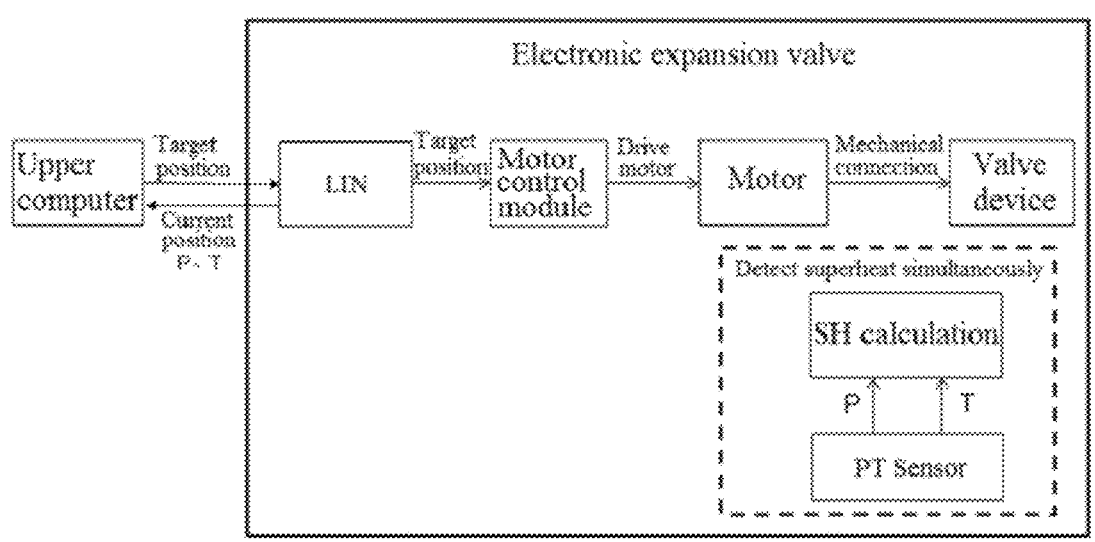
FIG. 4 is a flow chart of an opening control mode according to an embodiment of the present disclosure.

Based on the above technical solutions, as shown in FIGS. 2 and 4, a communication terminal D1 of an upper computer 200 is communicatively connected to a communication terminal A3 of the processing unit 101. The upper computer 200 is in a communication connection with the processing unit 101. For example, the communication connection may be performed through a local interconnect network (LIN) bus. The temperature signal at the outlet of the electronic expansion valve and the pressure signal at the outlet of the electronic expansion valve are fed back to the upper computer via the LIN bus. The upper computer, based on the temperature signal at the outlet of the electronic expansion valve and the pressure signal at the outlet of the electronic expansion valve, transmits a target position to a motor control module of the electronic expansion valve. The motor control module drives the motor to operate. The motor drives a valve device to operate to a target opening based on the target position.

In a case that the first current superheat is less than a first warning threshold for a first time period, the electronic expansion valve transmits a superheat alarm message to the upper computer. In the electronic expansion valve transmitting the superheat alarm message, in a case that the first current superheat is greater than a second warning threshold for a second time period, the electronic expansion valve transmits an abnormal superheat recovery message to the upper computer. For example, the first warning threshold may be about 1 Kelvin (K), the second warning threshold may be about 6 Kelvin (K), the first time period may be about 30 s, and the second time period may be 30 s.

Figure 5:
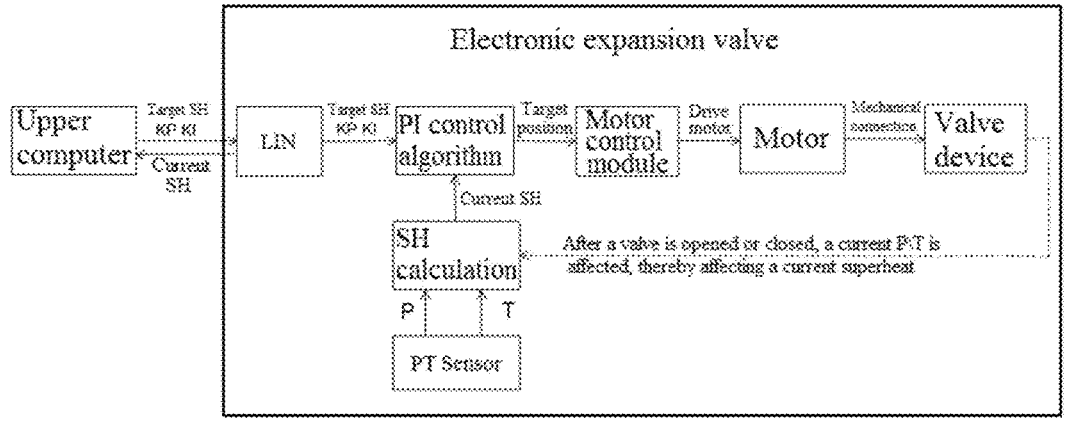
FIG. 5 is a flow chart of a superheat control mode according to an embodiment of the present disclosure.

Based on the above technical solutions, as shown in FIGS. 2 and 5, the communication terminal D1 of the upper computer 200 is communicatively connected to the communication terminal A3 of the processing unit 101. The upper computer is in a communication connection with the processing unit. For example, the communication connection may be performed through a local interconnect network (LIN) bus. In the superheat control mode, the electronic expansion valve obtains the first current superheat based on the temperature signal at the outlet of the electronic expansion valve and the pressure signal at the outlet of the electronic expansion valve. The first current superheat is fed back to the upper computer via the LIN bus. The upper computer transmits a target superheat to the electronic expansion valve via the LIN bus. The electronic expansion valve determines a target position by using a PI control algorithm based on the first current superheat and the target superheat. The motor control module of the electronic expansion valve drives the motor based on the target position. The motor drives the valve device to operate to a target opening.

In the superheat control mode, in a case that it is determined that the temperature signal and/or the pressure signal is abnormal, the processing unit controls the electronic expansion valve to operate in the opening control mode, and the electronic expansion valve operates to a safe position according to a requirement from the upper computer.

In a case that the temperature at the outlet of the electronic expansion valve is greater than or less than a preset temperature at the outlet of the electronic expansion valve and/or the pressure at the outlet of the electronic expansion valve is greater than or less than a preset pressure at the outlet of the electronic expansion valve, the first current superheat calculated by the processing unit is inaccurate, it is inaccurate to control the electronic expansion valve to operate in the superheat control mode, thus the processing unit 101 operates in the opening control mode. In the opening control mode, the upper computer transmits a target position to the electronic expansion valve based on the temperature signal at the outlet of the electronic expansion valve and the pressure signal at the outlet of the electronic expansion valve, the electronic expansion valve operates to a target opening based on the target position. Thereby, the electronic expansion valve operates to a safe position according to the requirements of the upper computer, protecting the system and the electronic expansion valve.

Figure 6:
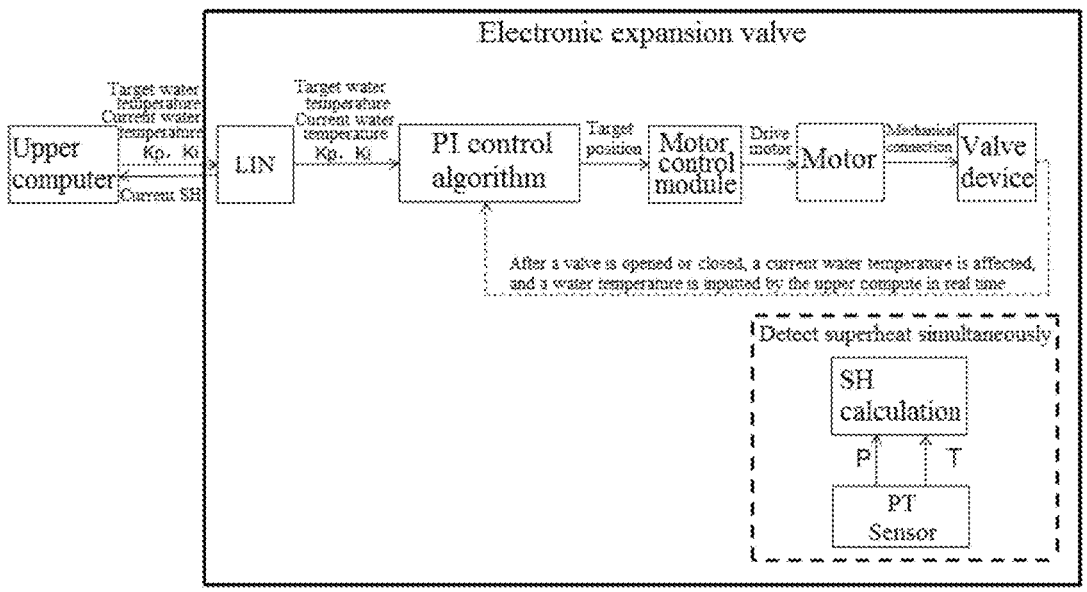
FIG. 6 is a flow chart of a temperature control mode according to an embodiment of the present disclosure.

Based on the above technical solutions, as shown in FIGS. 2 and 6, the communication terminal D1 of the upper computer 200 is communicatively connected to the communication terminal A3 of the processing unit 101. The upper computer 200 is in a communication connection with the processing unit 101. For example, the communication connection may be performed through a local interconnect network (LIN) bus. In the temperature control mode, the upper computer transmits a target temperature and a current temperature to the electronic expansion valve via the LIN bus. The electronic expansion valve feeds back a current superheat to the upper computer via the LIN bus. The electronic expansion valve determines a target position by using a PI control algorithm based on the target temperature and the current temperature. The electronic expansion valve operates to a target opening based on the target position. The motor control module of the electronic expansion valve drives the motor based on the target position. The motor drives the valve device to operate to the target opening.

In a case that the first current superheat is less than a first warning threshold for the first time period, the electronic expansion valve transmits a superheat alarm message to the upper computer. In the electronic expansion valve transmitting the superheat alarm message, in a case that the first current superheat is greater than a second warning threshold for a second time period, the electronic expansion valve transmits an abnormal superheat recovery message to the upper computer. For example, the first warning threshold may be about 1 Kelvin (K), the second warning threshold may be about 6 Kelvin (K), the first time period may be about 30 s, and the second time period may be about 30 s.

In the temperature control mode, on reception of the superheat alarm message, the upper computer may request the processing unit to control the electronic expansion valve to operate in the superheat control mode. In the superheat control mode, the upper computer transmits a target superheat to the electronic expansion valve, the electronic expansion valve determines the target position based on the first current superheat and the target superheat, and then the electronic expansion valve operates to a target opening based on the target position. On reception of the abnormal superheat recovery message, the upper computer may request the processing unit to control the electronic expansion valve to operate in the temperature control mode.

The temperature at the outlet of the electronic expansion valve is equal to the preset temperature at the outlet of the electronic expansion valve, and the pressure at the outlet of the electronic expansion valve is equal to the preset pressure at the outlet of the electronic expansion valve, so that the first current superheat calculated by the processing unit is accurate. A greater first current superheat indicates a better cooling effect. In a case that the first current superheat is greater than the second warning threshold, it is unnecessary for the processing unit 101 to reduce a difference between the first current superheat and the preset superheat by controlling the opening. Therefore, the processing unit 101 operates in the temperature control mode to control the opening to control a current refrigeration temperature to be equal to a preset refrigeration temperature, improving the real-time performance and accuracy of the control system for the opening of the electronic expansion valve.

The control system further includes a second temperature detection unit 201. The second temperature detection unit 201 is configured to obtain a current water temperature signal. An input terminal D2 of the upper computer 200 is electrically connected to an output terminal E1 of the second temperature detection unit 201. A target water temperature is determined based on the current water temperature signal. The current water temperature is a water temperature after performing heat exchange with a heat exchanger connected in series with the electronic expansion valve. The heat exchanger is a part of a heat management system. The heat management system may perform heat exchange on a battery to reduce or increase the temperature of the battery, thereby improving the performance of the battery. In the temperature control mode, the target temperature may be the target water temperature, and the current temperature may be the current water temperature.

The second temperature detection unit 201 may be, for example, a temperature sensor or a temperature detection circuit.

Based on the above technical solutions, the control system further includes a driving device 104. A control terminal F1 of the driving device 104 is electrically connected to an output terminal A4 of the processing unit 101. One end of a valve needle is rotatably connected to an output shaft of the driving device. For example, the driving device 104 may be a stepping motor. The processing unit 101 controls the driving device 104 to drive the valve needle to move to control the opening of the electronic expansion valve.

Figure 3:
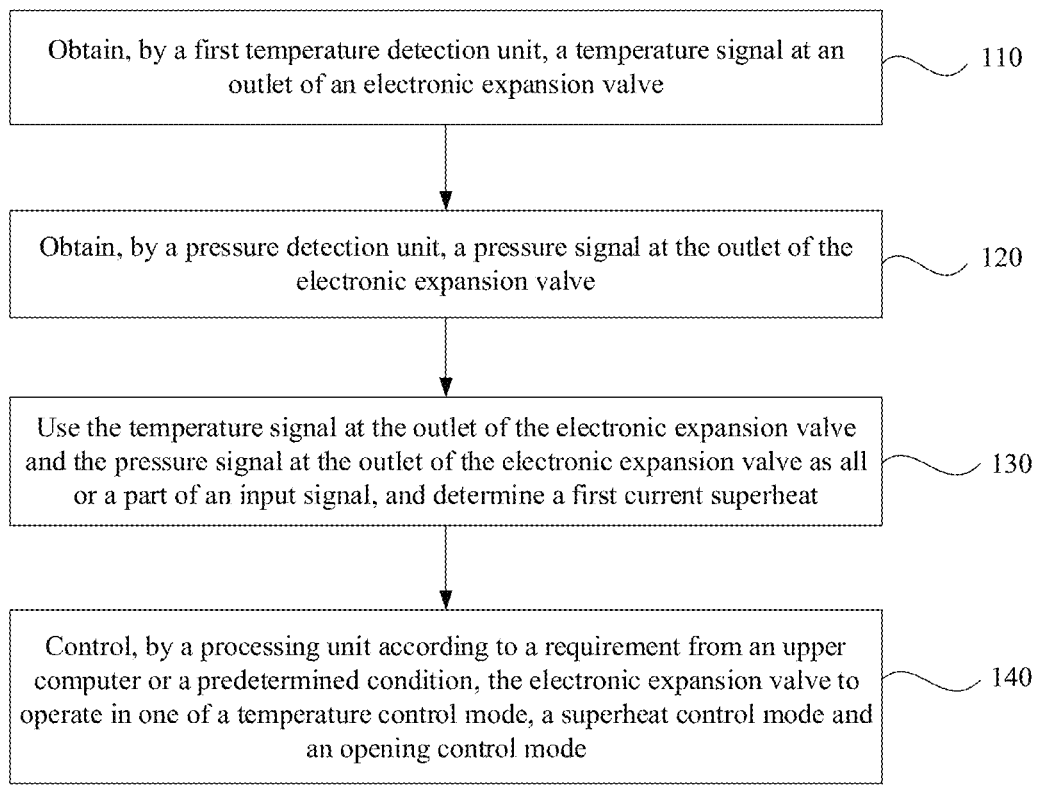
FIG. 3 is a flow chart of a control method according to an embodiment of the present disclosure.

Based on the same inventive conception, a method for controlling an opening of an electronic expansion valve is further provided according to an embodiment of the present disclosure. FIG. 3 shows a method for controlling an opening of an electronic expansion valve according to an embodiment of the present disclosure. As shown in FIG. 3, the method includes the following steps S110 to S140.

In step S110, a first temperature detection unit obtains a temperature signal at an outlet of an electronic expansion valve.

In step S120, a pressure detection unit obtains a pressure signal at the outlet of the electronic expansion valve.

In step S130, a processing unit determines a first current superheat based on the temperature signal at the outlet of the electronic expansion valve and the pressure signal at the outlet of the electronic expansion valve.

For example, the processing unit may determine the first current superheat by using a proportional-integral-derivative (PID) control algorithm based on the temperature signal at the outlet of the electronic expansion valve and the pressure signal at the outlet of the electronic expansion valve. A proportional coefficient, an integral coefficient and a differential coefficient used in each of calculations may be obtained by the processing unit from the upper computer.

In step S140, the processing unit controls the electronic expansion valve to operate in one of a temperature control mode, a superheat control mode and an opening control mode according to a requirement from the upper computer or a predetermined condition.

According to the technical solutions in the embodiments of the present disclosure, a first temperature detection unit 102 and a pressure detection unit 103 are integrated in a controller 100 of the electronic expansion valve. The processing unit 101 may determine the first current superheat based on the temperature signal at the outlet of the electronic expansion valve and the pressure signal at the outlet of the electronic expansion valve, and the processing unit 101 may control the opening. Therefore, the intelligence of the electronic expansion valve is improved, the workload of the upper computer is reduced, and the real-time performance and the accuracy of the control system for the opening of the electronic expansion valve are improved.

Figure 7:
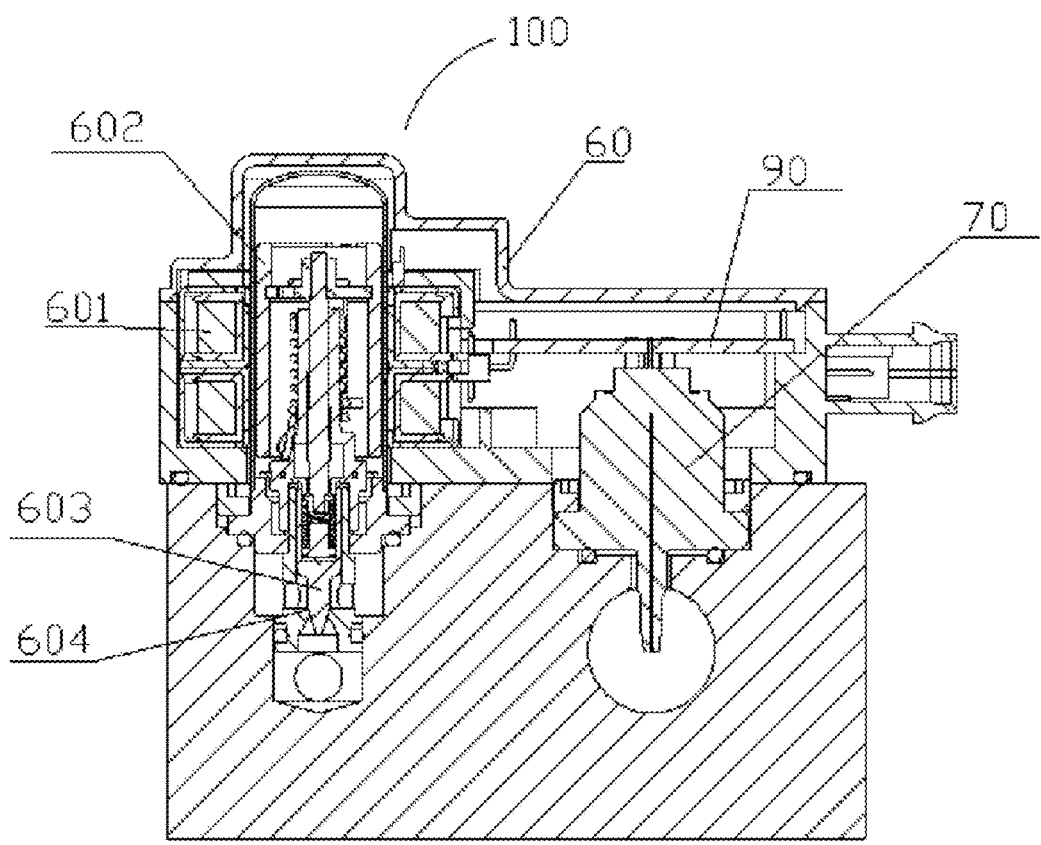
FIG. 7 is a schematic structural diagram of an electronic expansion valve according to an embodiment of the present disclosure.

An electric valve is further provided according to an embodiment of the present disclosure. FIG. 7 is a schematic structural diagram of an electronic expansion valve according to an embodiment of the present disclosure. As shown in FIG. 7, an electronic expansion valve 100 includes a housing 60, a stator assembly 601, a rotor assembly 602, a valve core 603, a sensor 70 and a circuit board assembly 90. The sensor 70 is configured to detect a temperature signal at an outlet of the electronic expansion valve and a pressure signal at the outlet of the electronic expansion valve. The sensor 70 is electrically and/or signally connected to the circuit board assembly 90. The circuit board assembly 90 is arranged in an inner cavity formed by the housing 60. The stator assembly 601 is arranged on an outer periphery of the rotor assembly 602. The rotor assembly 602 and the stator assembly 601 form a stepping motor in the electronic expansion valve 100. The stator assembly 601 includes a coil. The rotor assembly 602 includes a permanent magnet. The coil is electrically connected to the circuit board assembly 90. An excitation magnetic field is generated by the coil after being energized. The rotor assembly 602 operates in the excitation magnetic field. The stepping motor drives the valve core 603 of the electronic expansion valve to move relative to a valve port 604, so that the valve port 604 reaches an opening. A position of the valve core 603 is a position of the electronic expansion valve. The circuit board assembly 90 is integrated with the control system according to the above embodiments. Since the circuit board assembly 90 is integrated with the control system according to the above embodiments, the above beneficial effects in the above embodiments can be achieved, which are not repeated herein.

It should be noted that the above descriptions show only some preferred embodiments and technical principles of the present disclosure. Those skilled in the art should understand that the present disclosure is not limited to the embodiments herein. Those skilled in the art can make various obvious changes, readjustments and mutual combinations and substitutions to the present disclosure without departing from the protection scope of the present disclosure. Therefore, although the present disclosure is described in detail through the above embodiments, the present disclosure is not limited to the above embodiments. The present disclosure may further include more other equivalent embodiments without departing from the concept of the present disclosure, and the present disclosure should fall within the scope of the appended claims.

What is claimed is:

1. A control method, for controlling an electronic expansion valve that comprises a controller, comprising:
   obtaining a temperature signal at an outlet of the electronic expansion valve by using a temperature detector of the controller, and obtaining a pressure signal at the outlet of the electronic expansion valve by using a pressure detector of the controller;
   using, by the controller, the temperature signal at the outlet of the electronic expansion valve and the pressure signal at the outlet of the electronic expansion valve as all or a part of an input signal, and determining, by the controller, a first current superheat, wherein the first current superheat is a difference between a superheat temperature a saturation temperature of a refrigerant under a same evaporation pressure in a refrigeration cycle, there is a correspondence relationship between saturation temperatures and evaporation pressures, and the saturation temperature is obtained based on the evaporation pressure; and
   controlling, by the controller according to a requirement from an upper computer or a predetermined condition, the electronic expansion valve to operate in one of a temperature control mode, a superheat control mode and an opening control mode;
   wherein in the opening control mode, the upper computer transmits a target position to the electronic expansion valve based on the temperature signal at the outlet of the electronic expansion valve and the pressure signal at the outlet of the electronic expansion valve, and the electronic expansion valve operates to a target opening based on the target position.

2. The control method according to claim 1, wherein in the superheat control mode, the upper computer transmits a target superheat to the electronic expansion valve, the controller of the electronic expansion valve determines a target position based on the first current superheat and the target superheat, and then the electronic expansion valve operates to a target opening based on the target position.

3. The control method according to claim 1, wherein in the temperature control mode, the upper computer transmits a target temperature and a current temperature to the electronic expansion valve, the controller of the electronic expansion valve determines a target position based on the target temperature and the current temperature, and then the electronic expansion valve operates to a target opening based on the target position.

4. The control method according to claim 2, wherein in the temperature control mode, the upper computer transmits a target temperature and a current temperature to the electronic expansion valve, the controller of the electronic expansion valve determines a target position based on the target temperature and the current temperature, and then the electronic expansion valve operates to a target opening based on the target position.

5. The control method according to claim 1, wherein in a case that the first current superheat is less than a first warning threshold for a first time period, the controller of the electronic expansion valve transmits a superheat alarm message to the upper computer.

6. The control method according to claim 2, wherein in a case that the first current superheat is less than a first warning threshold for a first time period, the controller of the electronic expansion valve transmits a superheat alarm message to the upper computer.

7. The control method according to claim 3, wherein,
in a case that the first current superheat is less than a first warning threshold for a first time period, the controller of the electronic expansion valve transmits a superheat alarm message to the upper computer.

8. The control method according to claim 4, wherein
in a case that the first current superheat is less than a first warning threshold for a first time period, the controller of the electronic expansion valve transmits a superheat alarm message to the upper computer.

9. The control method according to claim 5, wherein
in the electronic expansion valve transmitting the superheat alarm message, in a case that the first current superheat is greater than a second warning threshold for a second time period, the controller of the electronic expansion valve transmits an abnormal superheat recovery message to the upper computer.

10. The control method according to claim 6, wherein,
in the electronic expansion valve transmitting the superheat alarm message, in a case that the first current superheat is greater than a second warning threshold for a second time period, the controller of the electronic expansion valve transmits an abnormal superheat recovery message to the upper computer.

11. The control method according to claim 9, wherein
in the temperature control mode,
the upper computer, on reception of the superheat alarm message, is capable of requesting the controller to control the electronic expansion valve to operate in the superheat control mode, and
the upper computer, on reception of the abnormal superheat recovery message, is capable of requesting the controller to control the electronic expansion valve to operate in the temperature control mode.

12. The control method according to claim 10, wherein
in the temperature control mode,
the upper computer, on reception of the superheat alarm message, is capable of requesting the controller to control the electronic expansion valve to operate in the superheat control mode, and
the upper computer, on reception of the abnormal superheat recovery message, is capable of requesting the controller to control the electronic expansion valve to operate in the temperature control mode.

13. The control method according to claim 9, wherein
in the superheat control mode, in a case that it is determined that the temperature signal and/or the pressure signal is abnormal, the controller controls the electronic expansion valve to operate in the opening control mode, and the electronic expansion valve operates to a safe position according to a requirement from the upper computer.

14. A control system, capable of controlling an electronic expansion valve, comprising a controller, wherein
the controller comprises a processor, a first temperature detector and a pressure detector,
the first temperature detector is configured to obtain a temperature signal at an outlet of the electronic expansion valve,
the pressure detector is configured to obtain a pressure signal at the outlet of the electronic expansion valve,
a first input terminal of the processor is electrically connected to an output terminal of the first temperature detection unit, a second input terminal of the processor is electrically connected to an output terminal of the pressure detector, the temperature signal at the outlet of the electronic expansion valve and the pressure signal at the outlet of the electronic expansion valve are used as all or a part of an input signal, and a first current superheat is determined,
the controller is integrated with a temperature control mode, a superheat control mode and an opening control mode, and the processor is configured to control the electronic expansion valve to operate in one of the temperature control mode, the superheat control mode and the opening control mode according to a requirement from an upper computer or a predetermined condition;
the controller is a part of the electronic expansion valve; and
in the opening control mode, the upper computer transmits a target position to the electronic expansion valve based on the temperature signal at the outlet of the electronic expansion valve and the pressure signal at the outlet of the electronic expansion valve, and the electronic expansion valve operates to a target opening based on the target position.

15. The control method according to claim 1, wherein
in the superheat control mode, the upper computer transmits a target superheat to the electronic expansion valve, the controller of the electronic expansion valve determines a target position based on the first current superheat and the target superheat, and then the electronic expansion valve operates to a target opening based on the target position.

16. The control method according to claim 1, wherein
in the temperature control mode, the upper computer transmits a target temperature and a current temperature to the electronic expansion valve, the controller of the electronic expansion valve determines a target position based on the target temperature and the current temperature, and then the electronic expansion valve operates to a target opening based on the target position.

17. The control method according to claim 1, wherein
in a case that the first current superheat is less than a first warning threshold for a first time period, the controller of the electronic expansion valve transmits a superheat alarm message to the upper computer.

18. The control method according to claim 7, wherein,
in the electronic expansion valve transmitting the superheat alarm message, in a case that the first current superheat is greater than a second warning threshold for a second time period, the controller of the electronic expansion valve transmits an abnormal superheat recovery message to the upper computer.

19. The control method according to claim 8, wherein,
in the electronic expansion valve transmitting the superheat alarm message, in a case that the first current superheat is greater than a second warning threshold for a second time period, the controller of the electronic expansion valve transmits an abnormal superheat recovery message to the upper computer.

* * * * *